United States Patent [19]

Brewer

[11] Patent Number: 4,927,088
[45] Date of Patent: May 22, 1990

[54] TIRE FEEDING STRUCTURE FOR TIRE SHREDDING APPARATUS

[75] Inventor: John C. Brewer, Salt Lake City, Utah

[73] Assignee: Garbalizer Machinery Corp., Salt Lake City, Utah

[21] Appl. No.: 316,012

[22] Filed: Feb. 27, 1989

[51] Int. Cl.5 ............................................. B02C 19/12
[52] U.S. Cl. .................................. 241/223; 241/243; 241/DIG. 31
[58] Field of Search ............. 241/101.7, 243, DIG. 31, 241/236, 222, 224, 225, 223

[56] References Cited

U.S. PATENT DOCUMENTS

| | | | |
|---|---|---|---|
| 821,447 | 5/1906 | Albrecht | 241/225 X |
| 3,578,252 | 5/1971 | Brewer . | |
| 4,061,277 | 12/1977 | Whitney . | |
| 4,119,277 | 10/1978 | Snyder et al. . | |
| 4,134,556 | 1/1979 | Ehrlich et al. | 241/DIG. 31 X |
| 4,205,799 | 6/1980 | Brewer . | |
| 4,374,573 | 2/1983 | Rouse et al. . | |
| 4,422,581 | 12/1983 | Chryst | 241/DIG. 31 X |
| 4,684,071 | 8/1987 | Dicky | 241/DIG. 31 X |

Primary Examiner—Mark Rosenbaum
Attorney, Agent, or Firm—Philip A. Mallinckrodt; Robert R. Mallinckrodt

[57] ABSTRACT

Feeding structure for tire shredding apparatus comprises a set of studded rollers defining a feed mouth opening into a feed throat that leads into the tire shredding mechanism. Forwardly placed lower and upper rolls rotate at different speeds, the upper faster than the lower and preferably having its studs configured to provide sharp points for penetrating into the tire and positively advancing it rearwardly toward the shredding mechanism. An endless conveyor carries individual tires sequentially into the feed mouth flatwise and the throat preferably slopes downwardly to present each tire to, but tilted backwardly from, the shredding mechanism. The rolls are mounted in a protective cover for the shredding mechanism, which cover is pivoted, so as to rise and fall in accordance with tire thickness, and is mounted on shock absorbers and preferably in supplemental, pivot supporting brackets.

20 Claims, 4 Drawing Sheets

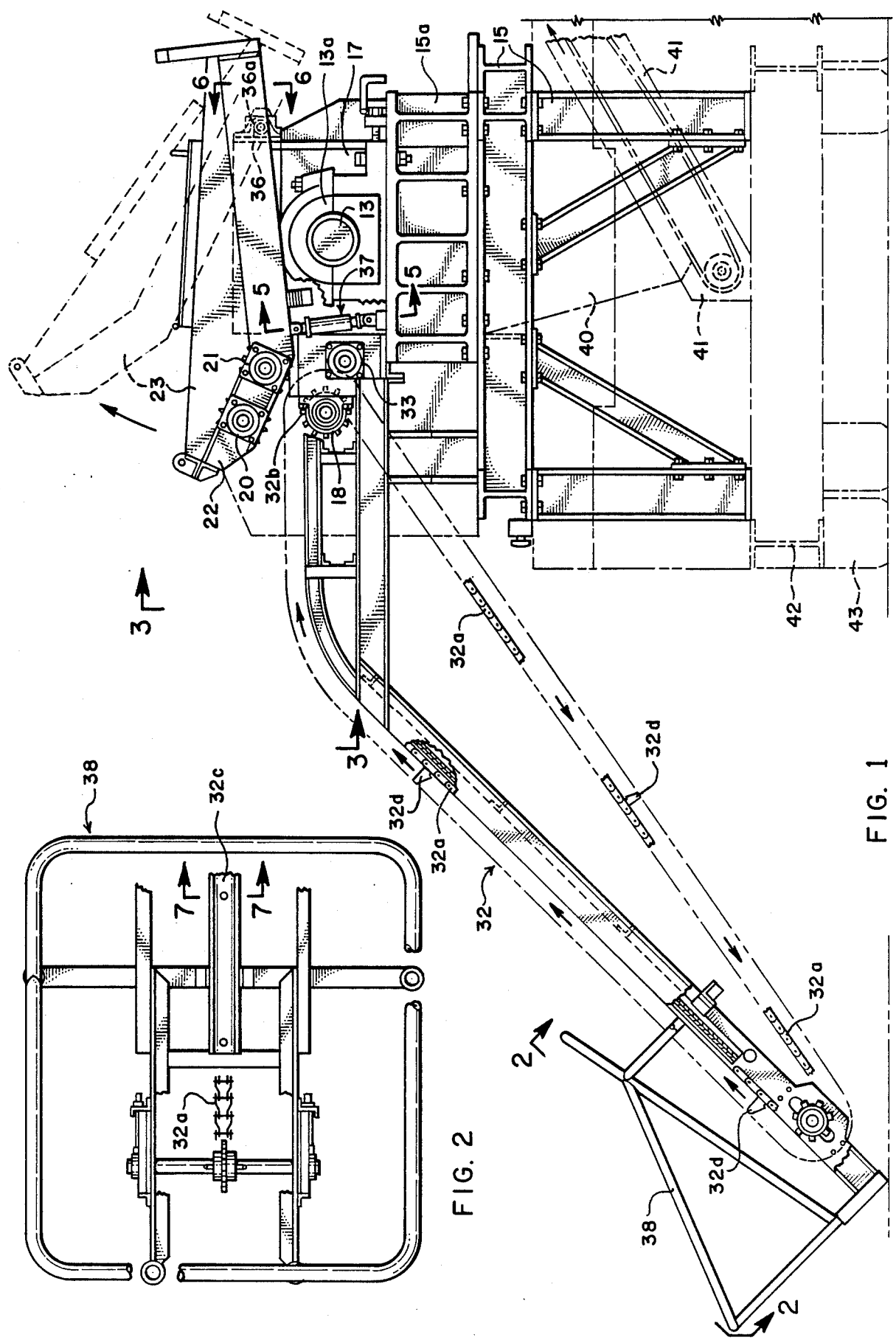

TIRE FEEDING STRUCTURE FOR TIRE SHREDDING APPARATUS

BACKGROUND OF THE INVENTION

1. Field

The invention is in the field of tire shredding apparatus and is concerned primarily with structure for feeding the tires into the cutting portion of the apparatus.

2. State of the Art

Machines for shredding tires are commercially available. One of the first is patterned after the waste shredding machine disclosed in my now expired U.S. Pat. No. 3,578,252 of May 11, 1971, in which several series of mutually spaced cutter blades project from the circumferences of respective counter-rotating shafts for shearing travel in corresponding spaces between a series of stationary cutter bars. The cutter blades serve, in effect, as scissor blades cooperating with reciprocal scissor blade edges of the stationary cutter bars that perform as anvils against which waste materials, such as tough and hard-to-cut rubber tires, are held by the inherent action of the machine as the cutter blades bear down upon them.

Various ways of feeding tires to such machines, other than the hopper shown by my aforesaid patent, have been devised, as shown in U.S. Pat. Nos. 4,061,277; 4,119,277; and 4,374,573. My U.S. Pat. No. 4,205,799 of June 3, 1980, among other improvements in the machine, discloses how feed into the shredding assembly of individual tires successively discharged downwardly from an endless conveyor is facilitated by arranging the cutter blades and the cutter bars at downwardly and outwardly inclined angles with respect to the rotary shaft on which the cutter blades are mounted, so that such blades act to pull the fed material into the shredding assembly.

However, with all of these feeding arrangements, tire shredding has been confronted by continuing difficulty in regulating the feed to prevent machine stoppages due to improper presentation of successive tires to the shredding mechanism.

Accordingly, it was a principal object in the making of the present invention to devise tire-feeding structure that would insure effective cutting presentation of successive tires to the tire shredding mechanism of apparatus of the type concerned so that work stoppages would be reduced to a minimum if not entirely eliminated. Another object was to provide a feeding arrangement that would effectively accommodate tires considerably different one from another in size.

SUMMARY OF THE INVENTION

In accordance with the present invention, the tire shredding mechanism is confronted on the tire feeding side thereof by a set of special feed rolls that receive individual tires successively from a known type of inclined conveyor equipped with a longitudinal series of mutually spaced, upstanding fingers that enable each of a series of tires being conveyed to the set of feed rolls to automatically position itself in substantially uniform orientation for most effective feed to the shredding mechanism.

The set of feed rolls comprises a lower feed roll and upper feed rolls, all in parallel orientation confronting, and in parallel with, the shredding mechanism to provide an open mouth in advance of the shredding mechanism and a throat also in advance of such mechanism but opening thereinto. The lower feed roll is axially concentric and preferably structurally coincident with the upper sprocket of the conveyor so as to rotate at the same speed of travel as the conveyor. At least a forwardly placed one of the upper feed rolls is arranged to be driven at a speed greater than that of the lower roll, and such upper feed rolls are mounted in common so as to rise relative to the lower feed roll and enlarge the mouth and throat, or lower to reduce the size of such mouth and throat, in accordance with tire size as successive tires are fed flatwise into the set of rolls. The throat preferably slopes downwardly toward the shredding mechanism so as to feed the tires in backwardly tilted orientation relative to the shredding mechanism.

A feature of the invention is the mounting of a protective cover over the set of feed rolls and over the shredding mechanism with effective shock absorbing capability but so that it may be raised and lowered to provide access to both feeding and shredding mechanisms for maintenance purposes.

THE DRAWINGS

The best mode presently contemplated for carrying out the invention in commercial practice is illustrated in the accompanying drawings, in which:

FIG. 1 represents a view in side elevation of a typical tire shredding apparatus equipped with a preferred embodiment of the feeding structure of the invention, the tire shredding mechanism being shown somewhat schematically;

FIG. 2, a fragmentary top plan view taken on the line 2—2 of FIG. 1 and showing the cage above the feed end of the endless tire-feeding conveyor in which the tires to be shredded are initially placed for transport to the shredding mechanism; portions of the cage being broken out to show otherwise hidden structure and the view being drawn to a larger scale;

FIG. 3, a similar, fragmentary, front elevational view taken on the line 3—3 of FIG. 1 and drawn to an even larger scale than is FIG. 2, certain parts in the background being shown by broken lines;

FIG. 4, a fragmentary view in vertical section taken transversely of the tire feeding rollers and of the tire shredding mechanism along the line 4—4 of FIG. 3, and drawn to a smaller scale than that of FIG. 3;

FIGS. 5 and 6, fragmentary vertical sections taken on the lines 5—5 and 6—6, respectively, of FIG. 1 and drawn to a larger scale to show details of construction;

FIG. 7, a similar sectional view taken on the line 7—7 of FIG. 2;

FIG. 8, a horizontal section taken on the line 8—8 of FIG. 5 and drawn to a somewhat larger scale; and FIG. 9, a vertical section taken on the line 9—9 of FIG. 6 but largely in elevation.

DETAILED DESCRIPTION OF THE ILLUSTRATED EMBODIMENT

Figure 4:
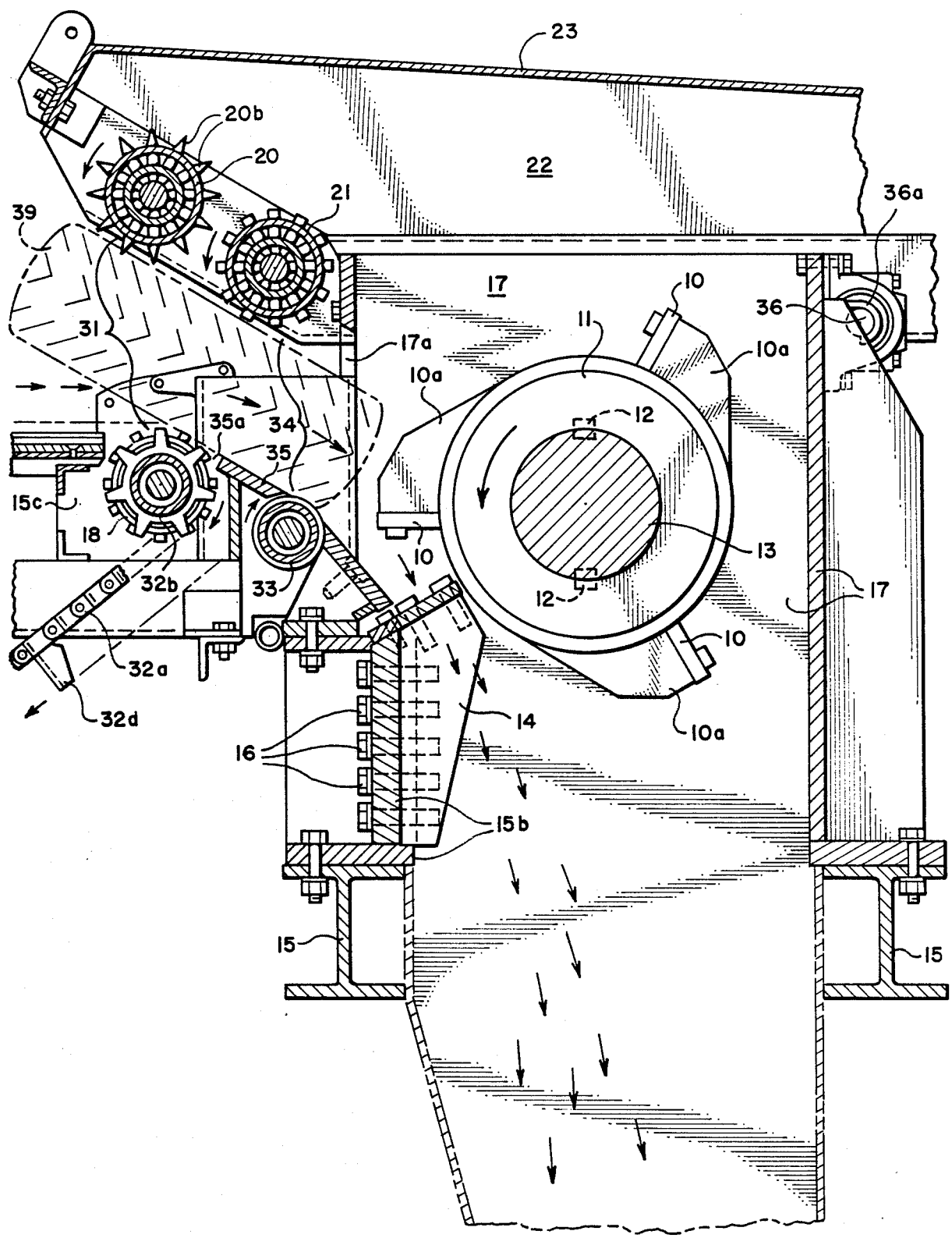

As has now become standard practice in the construction of tire shredding apparatus by Garbalizer Machinery Corporation of Salt Lake City, Utah, an elongate series of side-by-side-spaced sets of circumferentially spaced cutter blades 10, FIG. 4, are attached to holding arms 10a, respectfully, which project from a number of heavy, annular blade holders (not shown) that are fastened, along with a series of annular spacers 11, by keys 12 on a shaft 13 for rotation therewith relative to a correspondiagly elongate series of mutually spaced, stationary, cutter bars 14 serving as anvils during the cutting of tires fed into such tire shredding mechanism. The cutting is effected by scissor action of cooperative blade edges of paired cutter blades 10 and cutter bars 14, respectively. Shaft 13 is rotatably mounted at its opposite ends in respective pillow block bearings 13a resting respectively on heavy structural frame members 15a that rest, in turn, on heavy structural supporting framework 15 of the apparatus. The cutter bars 14 are shown as fastened individually to structural frame member 15b of such supporting framework 15 by machine screws 16.

Figure 3:
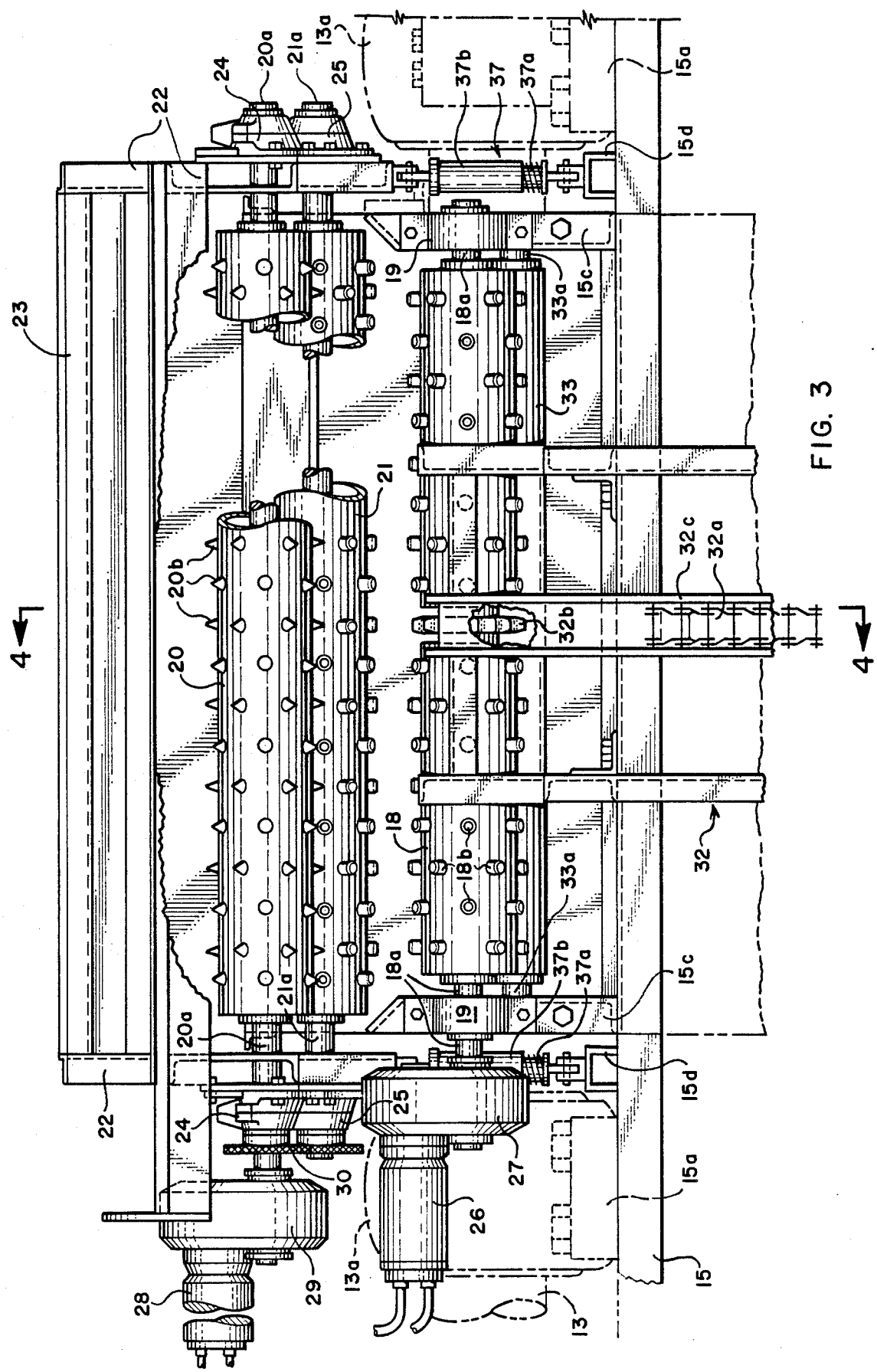

The shredding mechanism is enclosed by housing structure 17 having a feed opening 17a for tires conveyed to and fed into it by the tire feeding structure of the invention. As here shown, such tire feeding structure comprises a set of mutually parallel, studded rolls positioned forwardly of the shredding mechanism and, with such shredding mechanism constructed as previously described, in parallel with the series of cutter blades 10 and cutter bars 14. The set of studded rolls includes a lower roll 18, FIG. 3, fixed on a shaft 18a whose opposite ends are journaled in respective pillow block bearings 19 carried by respective structural frame members 15c of the supporting framework, and forward and rearward upper rolls 20 and 21, respectively, whose shafts 20a and 21a, respectively, pass through side walls 22 of a cover 23 and are journaled in respective bearing structures 24 and 25 that are fastened to the outside faces of such side walls 22.

Cutter blade shaft 13 is rotated counter-clockwise by the usual motor (not shown). Lower roll 18 of the set of rolls is rotated clockwise by a motor 26, FIG. 3, and speed reducing gears 27, and forwardly placed, upper roll 20 is rotated at greater speed than lower roll 18 by a motor 28 and speed reducing gears 29. Rearwardly placed, upper roll 21 is rotated at the same speed as roll 20 by means of a chain drive 30 interconnecting the shafts 20a and 21a thereof. The feed roll motors are preferably reversible under control of the operator so individual tires can be pulled backwardly out of the shredding mechanism if there is any clogging of the shredding mechanism.

Lower roll 18 and upper roll 20 provide a mouth 31, FIG. 4, therebetween into which successive tires from an endless, elevating conveyor 32 are fed substantially flatwise. An unstudded, lower, idler roll 33, freely rotatable in frame members 15c on a shaft 33a, is positioned rearwardly and preferably downwardly from roll 18. With upper roll 21, it defines a throat 34 that slopes downwardly to the shredding mechanism over a first threshold plate 35, whose forward margin 35a is serrated to closely accommodate the studs 18b of roll 18 to largely prevent any fine rubber particles from falling therebetween to the outside of the machine. In this way, individual tires are presented to the shredding mechanism most effectively, i.e., tilted backwardly from the shredding mechanism, for easy cutting with a minimum of clogging. It would be noted that the cutting blades 10 of the shredding mechanism tend to directly cut pieces from the walls of the tires rather than folding them over first so as to make cutting more difficult.

As an aid to effective presentation of the tires for cutting, it should be noted that the studs 20b of forwardly placed, upper roll 20 are sharply pointed so as to dig into the tires, penetrating and positively pulling them upwardly to disengagement from conveyor 32 and then forwardly into mouth 31 and pushing them into the bite of rearwardly placed upper roll 21.

Figure 5:
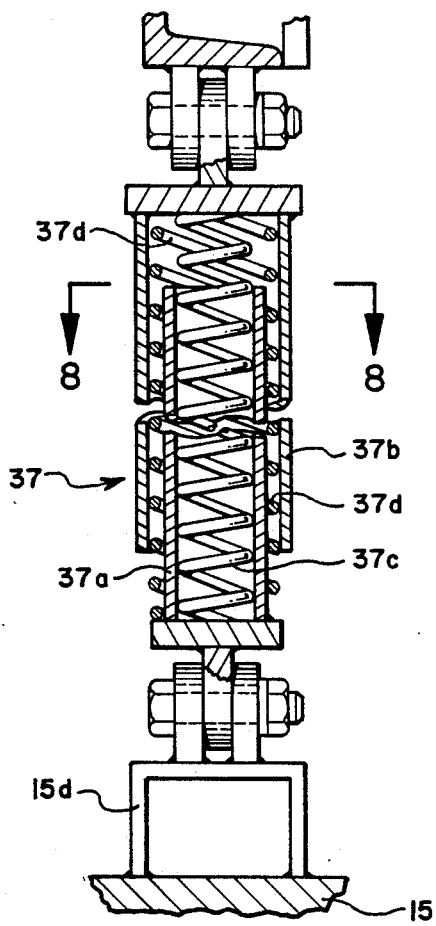
Figure 8:
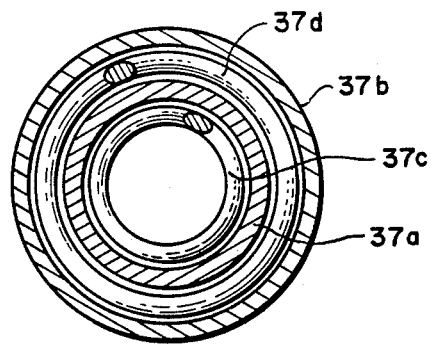
Figure 6:
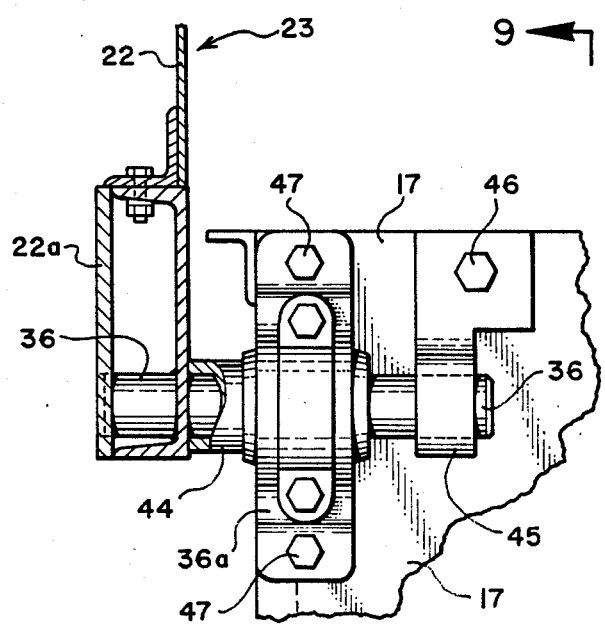
Figure 9:
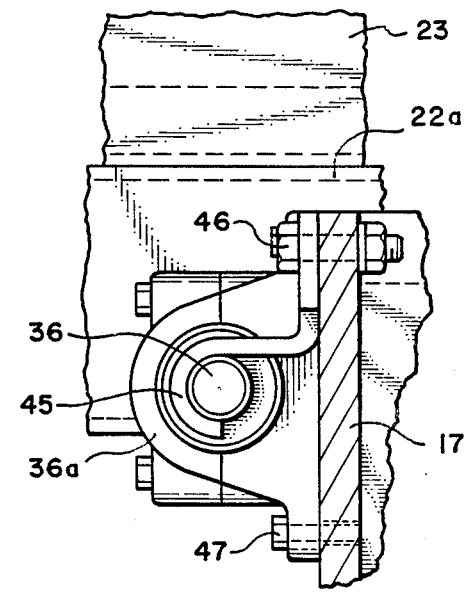

Cover 23 is pivotally mounted at 36, FIGS. 1, 6, and 9, in pillow block bearings 36a attached to the outside face of the rear wall of housing structure 17, whereby upper rolls 20 and 21 rise or lower relative to the lower feed rolls as different sized tires are fed into mouth 31 and descend through throat 34. Such cover 23 is supported forwardly of its pivotal mounting 36 and at opposite sides thereof by pivotally mounted shock absorbers 37, respectively, FIGS. 1 and 3, supported by frame members 15d of frame 15. Each of these shock absorbers comprises, in this instance, telescoped cylinders 37a and 37b, respectively, FIGS. 5 and 8, and sets of compression coil springs 37c and 37d, respectively.

Figure 7:
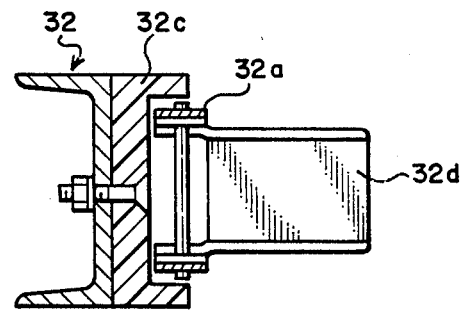

Elevating conveyor 32 slopes upwardly from a tire-receiving cage 38, that comprehends the lower end portion of such conveyor, to entry mouth 31 of the set of feed rolls and preferably into such mouth by reason of the fact that studded lower roll 18 is driven by conveyor chain 32a which extends over and mates with sprocket wheel 32b. As shown in FIG. 7, conveyor chain 32a preferably rests and travels in a plastic guide channel 32c, which is believed to be a unique feature of the construction. Tires 39, FIG. 4, are picked up from cage 38 by respective posts 32d of conveyor chain 32a and are carried single file up the slope of conveyor 32, meanwhile automatically shifting by gravity to symmetrically hung positions on the respective posts 32d, to and into entry mouth 31 of the set of feed rolls.

Cut pieces of tires fall by gravity from the shredding mechanism into a discharge chute 40, FIG. 1, and onto the lower end of an upwardly inclined, elevating conveyor 41 for deposit in a pile on the ground or into a suitable receiving vessel or vehicle trailer (not shown). In this illustrated embodiment, framework 15 is mounted on the bed 42 of a wheeled trailer 43 for convenience in moving the machine from place to place.

As shown in FIG. 6 and 9, the pivotal mounting of cover 23 is unique. For strength, rearward lower margins of side walls 22 of cover 23 are formed as box beams 22a through which respective pivot pins 36 extend and are journaled, there being respective tubular spacers 44 between such beams and the bearings 36a. Pivot pins 36 extend from the opposite sides of bearings 36a and are cradled in respective brackets 45, preferably bent to shape from heavy steel plate and attached to housing wall 17 by heavy bolts 46, so as to take most of the weight of cover 23 and of the rolls carried thereby if and when it becomes necessary to use a crane to raise such cover and place it in an upstanding, stable, open position to provide access to the shredding mechanism. This is necessary to relieve excessive weight on the relatively light bolts 47 that attach pillow block bearings 36a to housing wall 17.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. Tire shredding apparatus, comprising tire shredding mechanism; tire feeding structure comprising a set of rolls including lower and upper studded rolls for receiving tires fed flatwise thereinto, said set of rolls being rotatably mounted in mutually parallel relationship forwardly of said shredding mechanism and defining a downwardly sloping path of tire travel leading thereinto; and means for rotating said rolls toward said shredding mechanism.

2. Tire shredding apparatus according to claim 1, wherein there is a first upper roll spaced above a lower roll to provide a tire entry mouth, and a second upper roll spaced backwardly from said first upper roll.

3. Tire shredding apparatus according to claim 2, wherein the means for rotating said rolls comprises means for rotating said upper rolls in the direction of the shredding mechanism at a given speed; and means for rotating said lower roll in the direction of said shredding mechanism at a speed slower than that of said upper rolls.

4. Tire shredding apparatus according to claim 3, wherein the second upper roll is also spaced downwardly from the first upper roll; and there is a second lower roll spaced backwardly and downwardly from the studded lower roll, the lower and upper studded rolls and said second lower roll defining a throat leading downwardly from the mouth into the tire shredding mechanism.

5. Tire shredding apparatus according to claim 4, wherein the second lower roll is an unstudded idler roll.

6. Tire shredding apparatus according to claim 5, wherein the studs of the first upper roll are sharply pointed for digging into and propelling tires, that are fed into the tire feeding structure, toward the second upper roll and the shredding mechanism.

7. Tire shredding apparatus according to claim 6, wherein the upper rolls are mounted for movement upwardly or downwardly in accordance with different thicknesses of tires fed thereinto.

8. Tire shredding apparatus according to claim 7, wherein the mounting of the upper rolls is provided with shock absorber means.

9. Tire shredding apparatus according to claim 8, including endless conveyor means positioned forwardly of and sloping upwardly toward and to the tire entry mouth from a tire-receiving location.

10. Tire shredding apparatus according to claim 9, wherein the conveyor means is a chain conveyor, and wherein there is included a bed of plastic material in and along the conveying reach of the chain as said conveyor travels.

11. Tire shredding apparatus according to claim 9, including a tire-receiving cage above and open at its bottom to said conveyor means at said tire-receiving location, said conveyor means having a longitudinal series of mutually spaced, upstanding posts substantially centrally thereof and of said tire-receiving cage, whereby tires loaded into said cage are picked up flatwise and sequentially by respective individual posts and shift automatically by gravity to substantially symmetrically hung positions on said conveyor for uniform feeding into the tire entry mouth.

12. Tire shredding apparatus according to claim 1, wherein the tire shredding mechanism is equipped with rotary cutter blades and stationary cutter bars that serve as anvils, said rotary cutter blades being operative relative to said stationary cutter bars in scissor-like action.

13. Tire shredding apparatus according to claim 12, including an endless conveyor having a receiving end positioned below the tire shredding mechanism for receiving tire cuttings from said shredding mechanism.

14. Tire shredding apparatus according to claim 1, including a protective cover for the set of rolls, said cover being pivotally mounted rearwardly of the shredding mechanism and is supported forwardly of the shredding mechanism by shock absorber means.

15. Tire shredding apparatus according to claim 14, wherein the shock absorber means are in the form of telescoped outer and inner cylinders, and compression coil springs within and between the cylinders, respectively.

16. Tire shredding apparatus according to claim 14, wherein the pivotal mounting comprises pivot pins at opposite sides of the cover, respectively; respective bearings journaling said pivot pins, which extend beyond said bearings; and supporting brackets cradling the extended portions of said pivot pins, respectively, for receiving and bearing cover weight when the cover is in an upstanding, open position.

17. Tire shredding apparatus, comprising tire shredding mechanism including a series of side-by-side-spaced sets of circumferentially spaced cutter blades arranged for cooperative, scissor action relative to a corresponding series of side-by-side-spaced cutter bars serving as anvils; and tire feeding structure having a set of rolls including lower and upper studded rolls for receiving tires fed flatwise thereinto, said set of rolls being rotatably mounted in mutually parallel relationship forwardly of said shredding mechanism and defining a downwardly sloping path of tire travel leading thereinto; and means for rotating said rolls toward said shredding mechanism.

18. Tire shredding apparatus according to claim 17, where there is a first upper roll spaced above a lower roll to provide a tire entry mouth, and a second upper roll spaced backwardly and downwardly from said first upper roll.

19. Tire shredding apparatus according to claim 18, wherein the means for rotating said rolls comprises means for rotating said upper rolls in the direction of the shredding mechanism at a given speed; and means for rotating said lower roll in the direction of said shredding mechanism at a speed slower than that of said upper rolls.

20. Tire shredding apparatus according to claim 19, wherein the second upper roll is also spaced downwardly from the first upper roll; and there is a second lower roll spaced backwardly and downwardly from the studded lower roll, the lower and upper studded rolls and said second lower roll defining a throat leading downwardly from the mouth into the tire shredding mechanism.

* * * * *